(No Model.)  3 Sheets—Sheet 1.

O. F. LEIBERT.
WATER HEATER.

No. 568,690.  Patented Sept. 29, 1896.

Witnesses
Jno. J. Hinkel
J. A. Fairgreve

Inventor
Owen F. Leibert
by
Foster Freeman
Attorneys

THE NORRIS PETERS CO., PHOTO-LITHO., WASHINGTON, D. C.

(No Model.)  3 Sheets—Sheet 2.

O. F. LEIBERT.
WATER HEATER.

No. 568,690. Patented Sept. 29, 1896.

Witnesses

Inventor
Owen F. Leibert

Attorneys (No Model.) 3 Sheets—Sheet 3.
O. F. LEIBERT.
WATER HEATER.
No. 568,690. Patented Sept. 29, 1896.
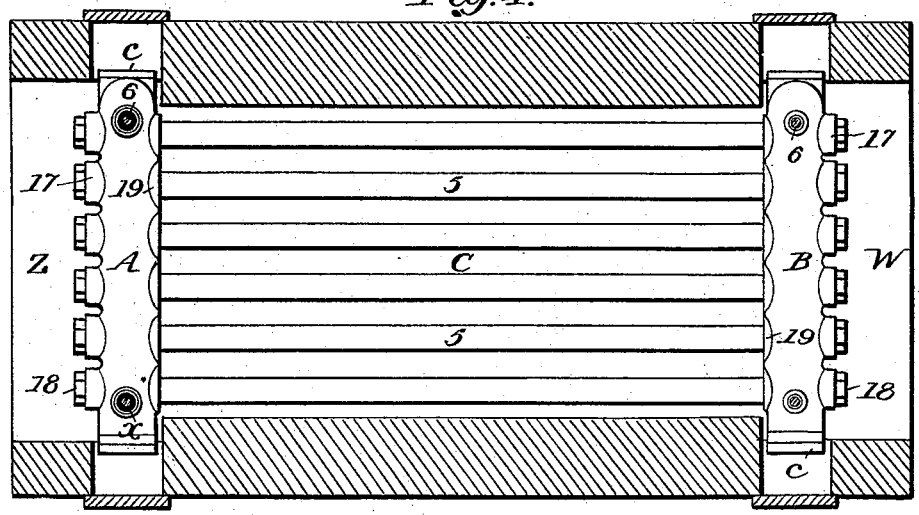
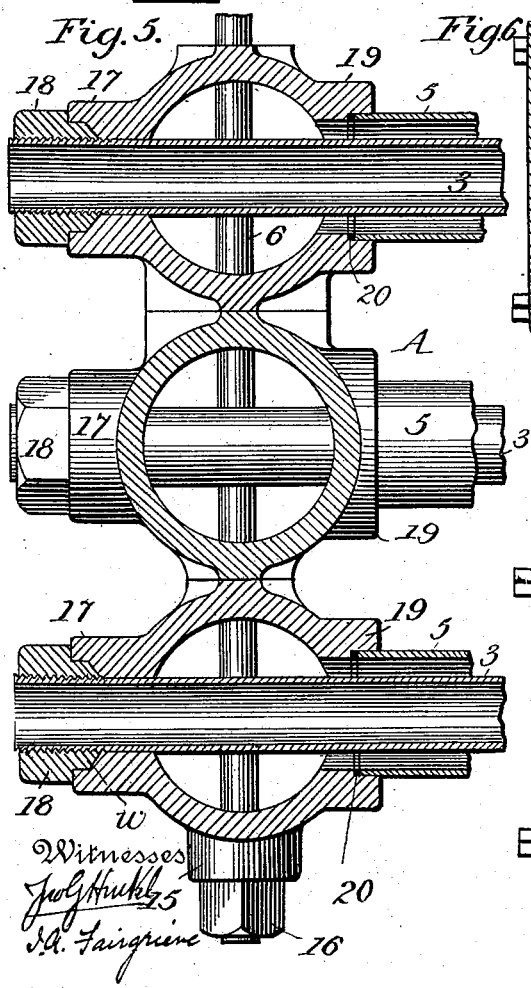
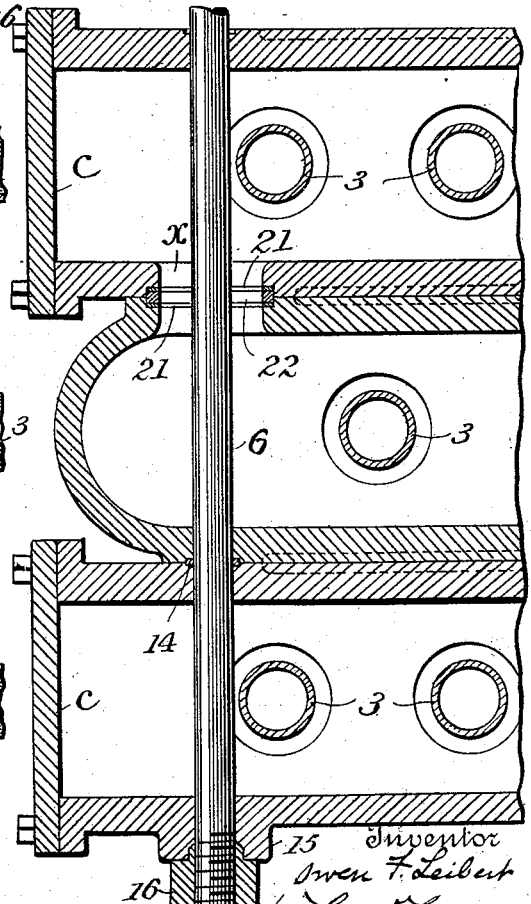

UNITED STATES PATENT OFFICE.

OWEN F. LEIBERT, OF BETHLEHEM, PENNSYLVANIA.

WATER-HEATER.

SPECIFICATION forming part of Letters Patent No. 568,690, dated September 29, 1896.

Application filed January 28, 1895. Serial No. 536,475. (No model.)

*To all whom it may concern:*

Be it known that I, OWEN F. LEIBERT, a citizen of the United States, residing at Bethlehem, in the county of Northampton and State of Pennsylvania, have invented certain new and useful Improvements in Water-Heaters, of which the following is a specification.

My invention has for its object to heat with rapidity water or other liquid either for feed-water or steam-generating or other purposes, and to this end I make use of a water-heater consisting of two series of casings and intermediate water and gas tubes constructed and arranged to operate as fully set forth hereinafter, and as illustrated in the accompanying drawings, in which—

Figure 1:
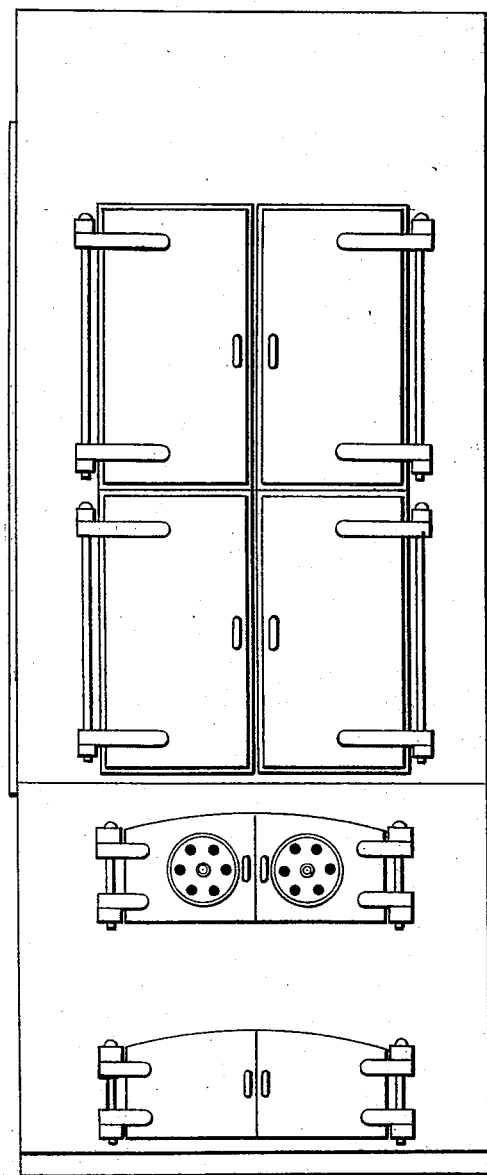
Figure 2:
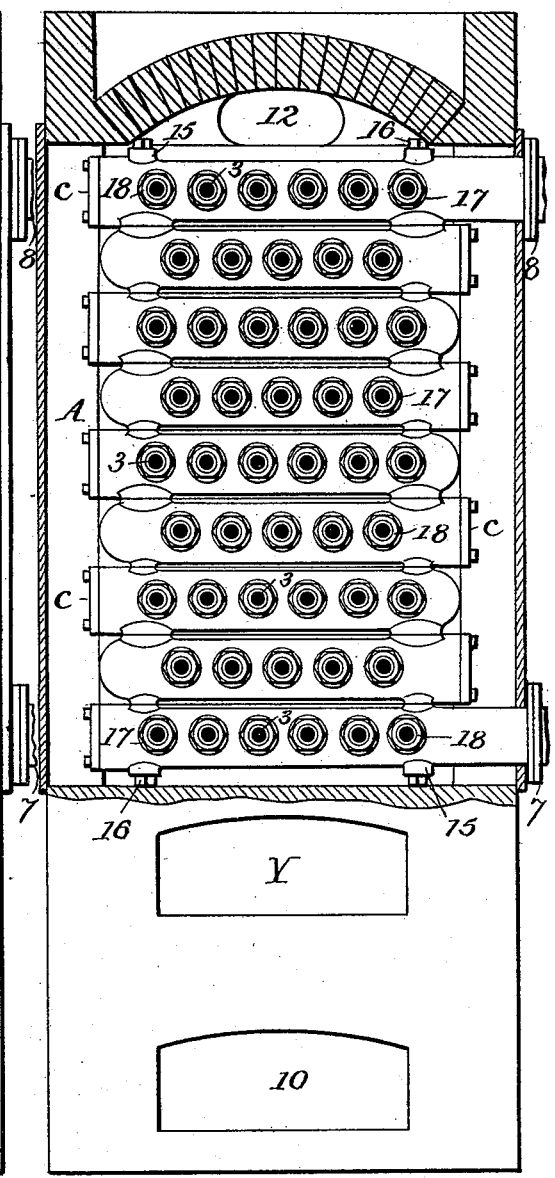
Figure 3:
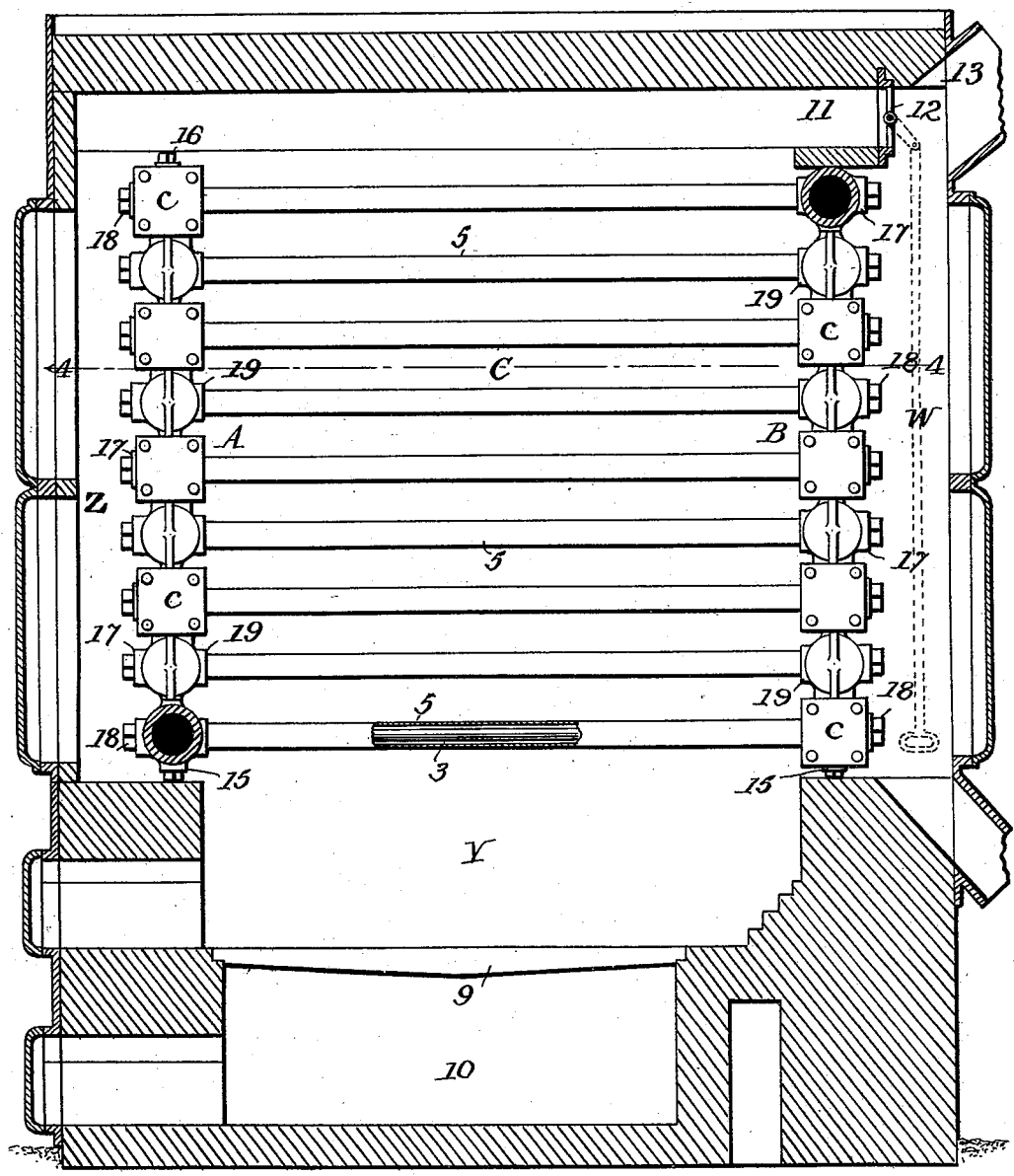

Figure 1 is a front elevation of a feed-water heater embodying my improvements; Fig. 2, the same in part section through the inclosing walls; Fig. 3, a longitudinal vertical elevation in section; Fig. 4, a section on the line 4 4, Fig. 3. Fig. 5 is an enlarged longitudinal section through three of the front casings, showing parts of the water and gas tubes. Fig. 6 is an enlarged longitudinal section through three of the casings at one end.

The heater, whether for heating the feed-water for boilers or for heating water to generate steam or for other purposes, consists, essentially, of two series of casings A B and connecting water and gas pipes, the water-pipes 5 extending across from one series of casings to the other, and the gas flues or pipes 3, of smaller diameter than the water-pipes, extending through the water-pipes and through the casings, so as to leave an intermediate annular water-space for the flow of water within each water-pipe 5 and outside of the gas-pipe 3 from one series of casings to the other. Each casing of each series is so constructed that it may lie flat upon the casing beneath, so that all the casings in each series will together form a wall or partition, and when in place all of the casings of each series are bolted together by bolts 6, extending through the casings near the ends thereof.

The lowermost casing A of the front series of casings is provided with a flanged end or neck, to which is bolted the flanged end of the water-inlet pipe 7.

The lowermost casing A communicates with lowermost casing B of the opposite series only through the annular space between the pipes 3 5, but the lowermost casing B of the opposite series communicates through an opening $x$, Fig. 6, with the casing above it; but the latter does not communicate with the casing above it, but communicates with the casing A above the lowermost casing of the forward series, and the latter casing A communicates with the casing above it, and so on, the casings of each series being therefore arranged in communicating pairs with intermediate casings which do not communicate with those above or below them, but only with the lower of a pair of casings of the opposite series. By this arrangement the water flows first through the lower series of connecting-pipes and through one pair of casings at the rear through the next series of connecting-pipes, and then forward through one pair of casings at the front through the next higher series of connecting-pipes, and then back through another pair of communicating casings at the rear and through another series of communicating pipes, and so on, until it passes to the uppermost casing of the series at the rear, which communicates with the outlet water-pipe 8, having a flange bolted to the flange of the uppermost casing B.

The parts above described are arranged within suitable walls or masonry constructed so as to form a fireplace Y, with grate-bars 9 and an ash-pit 10, and the space above which is divided by the two series of casings, (constituting walls or partitions,) so as to form a front flue or chamber Z, a back flue or chamber W, and an intermediate chamber C, which communicates at the top with the chamber Z and at the rear with a flue 11, provided with a valve or damper 12, upon opening which a direct communication between the chamber C is afforded with the rear chamber or flue W, the latter communicating with the flue 13, leading to the chimney.

While the parts of the structure above described may be constructed and fitted together and secured in position in different ways, I prefer to make use of certain details of construction, which I will now describe.

Each casing A or B is preferably made of cast metal, with bosses constituting bearings for the nuts of the connecting bolts or pipes and for the ends of the water-pipes. Thus, as shown, the connecting-bolts 6 pass through the ports or openings x, which are larger in diameter than the said pipes, and also through openings in the casings of but little greater diameter than the bolts, with packings 14 between the adjacent casings at the points where the bolts 6 pass through the same to prevent the passage of water either from one casing to the other or leakage from the casings, and the outer casings of each series have bosses 15, upon which bear the nuts 16, screwing onto the ends of the bolts. Each of the casings is also provided with bosses 17, against which bear the nuts 18, screwing onto the ends of the gas-pipes, and at the opposite side with bosses 19, fitted to a socket, in each of which extends the end of the water-pipe 5, the end of the pipe bearing upon a packing 20, which, like the packing 14, is preferably in the form of a one-eighth-inch copper ring.

At the joints between the casings where the ports x are formed the casings are recessed to receive annular packings, consisting of two copper rings 21 21 and an intermediate steel ring 22, which are pressed tightly together and effectually prevent leakage at the joints when the nuts are screwed down upon the bolts 6.

Each of the nuts 18 is preferably made of bronze and has an annular projection w with a beveled edge fitting a socket with a beveled bottom in the boss 17, thereby forming a permanent gland with the nut and a tight joint around the pipe 3, and the nuts 16 may have similar projections with beveled ends fitting similar recesses in the bosses 15.

Preferably each casing A is provided at one end (or at both ends, if desired) with a detachable cap or cover c, bolted in place but so as to be readily removed to permit the cleaning of the casings. Doors are placed opposite the front and back flues or chambers Z W to permit ready access thereto for cleaning.

When the apparatus is in use, the heated gases from the fuel upon the bars 9 pass upward and are consumed in the chamber C and in the flues Z and W, the gases flowing to the top of the chamber C, where they are turned down by the arched roof thereof and enter the front flue Z and pass longitudinally through the gas-pipes 3 to the back flue W, and thence to the chimney.

When the apparatus is used for a feed-water heater, the water is forced at a high speed from the inlet-pipe 7 into the casings, passes through the annular spaces between the gas-tubes and the water-tubes, where it is heated upon both sides of the annular passages, and therefore takes up the heat with great rapidity, flowing back and forth from one series of horizontal pipes to that above it, and so on, until it passes from the heater at the outlet.

It will be noticed that the casings are placed free of the walls, so that they are heated by the gases which pass upward in the chamber C and downward through the flue Z and upward through the flue W, thereby securing increased heating-surface.

When the apparatus is used as a generator, a steam-drum will be placed outside at the top, taking the place of the brick arch closing the top of the fire-chamber.

Without limiting myself to the precise construction and arrangement of parts shown and described, I claim—

1. In a water-heater, the combination of two series of casings, each constituting a closed wall or partition, the casings of each wall being arranged in vertically-communicating pairs, water-pipes connecting the upper casings of one wall with the lower casings of the pairs of the other wall, and gas-pipes extending through the water-pipes and through the casings, substantially as described.

2. In a water-heater, the combination with suitable inclosing walls forming a chamber, of two series of casings, the casings of each series being assembled to constitute a closed wall or partition within the chamber, said casings extending transversely across said chamber, and arranged in vertically-communicating pairs, series of water-pipes connecting the upper casing of each pair of one wall with the lower casing of each pair of the other wall and gas-pipes extending through the water-pipes and through the casings, substantially as described.

3. In a water-heater, the combination with suitable inclosing walls, of two series of casings, the casing of each series being assembled within the inclosing walls to constitute a closed partition, said partitions being arranged to form front and back flues, and a chamber intermediate said flues, said intermediate chamber having direct communication with the front flue but not with the back flue, a fireplace communicating with the intermediate chamber, a series of water-pipes connecting the partitions extending through said chamber and gas pipes extending through the water-pipes whereby the front and back flues are connected, substantially as described.

4. In a water-heater, the combination with suitable inclosing walls, of two series of casings, the casings of each series being assembled within the inclosing walls to constitute a closed partition, said partitions being arranged to form front and back flues and a chamber intermediate said flues, said intermediate chamber having direct communication with the front flue at a point above the plane of the water-tubes, but not with the back flue, a fireplace communicating with the intermediate chamber, a series of water-pipes connecting the partitions, extending through said chamber, and gas-pipes extending through the water-pipes and through the partition whereby the front and back flues are connected, substantially as described.

5. The combination with adjacent casings assembled to form a closed wall or partition, and ports connecting the casings in vertically-arranged pairs, and bolts extending alternately through the walls of the casings and through the ports intermediate of the sections, substantially as described.

6. In a water-heater, the combination with a series of hard metallic casings having communicating openings and recesses extending outward from and around said openings, packings in said recesses consisting of superposed soft and hard metallic rings, the soft-metal rings being intermediate the casings and the hard-metal rings, and means for securing the casings together, substantially as described.

7. In a water-heater, the combination with a series of hard metallic casings, having communicating openings forming ports, recesses extending outward from and around the ports, packings in said recesses, consisting of superposed soft and hard metal rings, the soft-metal rings being intermediate the casings, and the hard-metal rings and bolts extending through the casings from the upper to the lower one thereof for securing them together, substantially as described.

8. The combination with the adjacent casings having openings forming ports $x$, bolts connecting the casings, recesses extending outward from and around the ports $x$, and metallic packing-rings arranged in said recesses, substantially as described.

9. The combination with adjacent casings each formed of a series of sections to form hollow closed walls, ports connecting the sections in pairs, bolts for securing the sections together, extending alternately through the walls of the sections and through the ports therein, packing arranged around the bolts and ports intermediate of the sections, and pipes extending between the casings, substantially as described.

In testimony whereof I have signed my name to this specification in the presence of two subscribing witnesses.

OWEN F. LEIBERT.

Witnesses:
JOSEPH M. LEIBERT, Jr.,
C. O. BRUNN.